(12) United States Patent
Mujeeb et al.

(10) Patent No.: US 8,745,590 B2
(45) Date of Patent: Jun. 3, 2014

(54) TESTING AN APPLICATION

(75) Inventors: Umar Mujeeb, Irving, TX (US);
Muhammed Shaphy, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 215 days.

(21) Appl. No.: 13/111,718

(22) Filed: May 19, 2011

(65) Prior Publication Data

US 2012/0297367 A1 Nov. 22, 2012

(51) Int. Cl.
*G06F 9/44* (2006.01)

(52) U.S. Cl.
USPC ............ 717/125; 717/124; 717/126; 717/128

(58) Field of Classification Search
None
See application file for complete search history.

(56) References Cited

U.S. PATENT DOCUMENTS

| | | | | |
|---|---|---|---|---|
| 6,002,871 A * | 12/1999 | Duggan et al. | ................ | 717/135 |
| 7,237,014 B2 * | 6/2007 | Drummond, II | ............. | 709/217 |
| 7,950,004 B2 * | 5/2011 | Vieira et al. | ................. | 717/125 |
| 8,074,204 B2 * | 12/2011 | Comstock et al. | ............ | 717/125 |
| 8,082,541 B2 * | 12/2011 | Pramanick et al. | ........... | 717/130 |
| 8,104,020 B2 * | 1/2012 | Sharma et al. | ................ | 717/125 |
| 8,185,877 B1 * | 5/2012 | Colcord | ........................ | 717/127 |
| 8,191,048 B2 * | 5/2012 | Parthasarathy et al. | ....... | 717/126 |
| 8,359,580 B2 * | 1/2013 | Gonzales et al. | ............ | 717/128 |
| 8,381,184 B2 * | 2/2013 | Johnson et al. | ............... | 717/124 |
| 8,473,916 B2 * | 6/2013 | Venkatraman et al. | ....... | 717/124 |
| 8,555,253 B2 * | 10/2013 | Shufer et al. | .................. | 717/125 |
| 2009/0150867 A1 * | 6/2009 | Vorungati | ..................... | 717/124 |
| 2010/0180260 A1 * | 7/2010 | Chikkadevaiah et al. | .... | 717/125 |
| 2010/0333072 A1 * | 12/2010 | Dulip et al. | ................... | 717/128 |
| 2013/0014084 A1 * | 1/2013 | Sahibzada et al. | ............ | 717/124 |

OTHER PUBLICATIONS

Yuan et al., Using GUI Run-Time State as Feedback to Generate Test Cases, May 2007, 10 pages.*
You et al., An empirical study on the effectiveness of time-aware test case prioritization techniques, Mar. 2011, 6 pages.*

* cited by examiner

*Primary Examiner* — Thuy Dao (57) ABSTRACT

A device receives a test case from a management server. The test case includes a request used for a test of an application, an expected response to the request, and an identifier of an application server that executes the application. The device transmits, based on the identifier, the request to the application server. The device further receives a test response in reply to the request. The device also generates a test result based on the expected response and the test response, and displays the test result.

19 Claims, 9 Drawing Sheets

TESTING AN APPLICATION

BACKGROUND

Entities (e.g., businesses) develop software applications for internal use to help the entities perform various tasks. An application often includes different modules that perform different functions. Software developers (e.g., programmers) may update an application by creating new modules and/or new versions of modules for the application in response to evolving business needs and/or technical innovations. Before the updated application is deployed, the updated application may need to be certified (e.g., tested) to ensure that the application functions properly with the new modules and/or the new versions of the modules. To do so, as after each update of the application, human testers have to manually repeat a process used to ensure that the updated application is functioning properly. Furthermore, considerable efforts are expended to track how different requests are processed by the updated application and/or how operations of hardware (e.g., central processing unit (CPU) usage, memory usage, etc.) are affected by the updated application.

DETAILED DESCRIPTION OF PREFERRED EMBODIMENTS

The following detailed description refers to the accompanying drawings. The same reference numbers in different drawings may identify the same or similar elements.

In one implementation, described herein, a user device may request testing information from a management server in order to test an application executed by an application server. The management server may provide the testing information to the user device. The testing information may include one or more different test cases for different tests. Each one of the test cases may provide information about a test, instructions for running the test, a request to use for the test, and/or an expected response to the request. The user device may use the testing information to automatically test the application. A user of the user device may use a dashboard to receive the test cases, to select one or more of the test cases, to perform one or more tests of the test cases, and to review test results of the tests. The test results may include information about tests for which the application passed, tests for which the application failed, and/or incomplete tests (e.g., tests that are in progress). Furthermore, the user may use the dashboard to compare a received test response, associated with a test result, to an expected response specified in a test case. The user may further use the dashboard to modify a test case, based on the received test response, and to repeat the test.

In another implementation, described herein, a management server may allow a user to retrieve session information about a particular session. A user of the user device may select a particular application server. The particular application server may execute the particular session, which is an instance of the particular application. The particular application server may execute the particular session to, for example, satisfy (e.g., in response to) a request of a test case. The management server may provide a list of sessions associated with the particular application server. The user may select an identifier associated with the particular session. The management server may provide location information about where session information about the particular session is stored. The location information may identify, for example, a logging server. The application server may provide the session information to the logging server during/after the particular session (i.e., the execution of the particular request). The user device may retrieve, based on the location information, the session information from the logging server. The session information may include a response time associated with the session, one or more errors associated with (e.g., that occurred during) the session, and/or any other information associated with a performance of the request during the session. The user may use the same dashboard, which the user uses to access testing information, to access the session information.

In yet another implementation, described herein, a management server may monitor hardware operations of one or more application servers, which execute one or more applications. The management server may transmit operations information, based on the hardware operations, to a user device. The operations information may include CPU usage, memory usage, a number of requests received by the application server, an average amount of time used to process the requests, and/or any other information associated with the processing of the requests by the application server and/or any other devices associated with the application server (e.g., a database (DB) server). The user may use the same dashboard, which the user uses to access testing information and the session information, to access the operations information.

Figure 1:
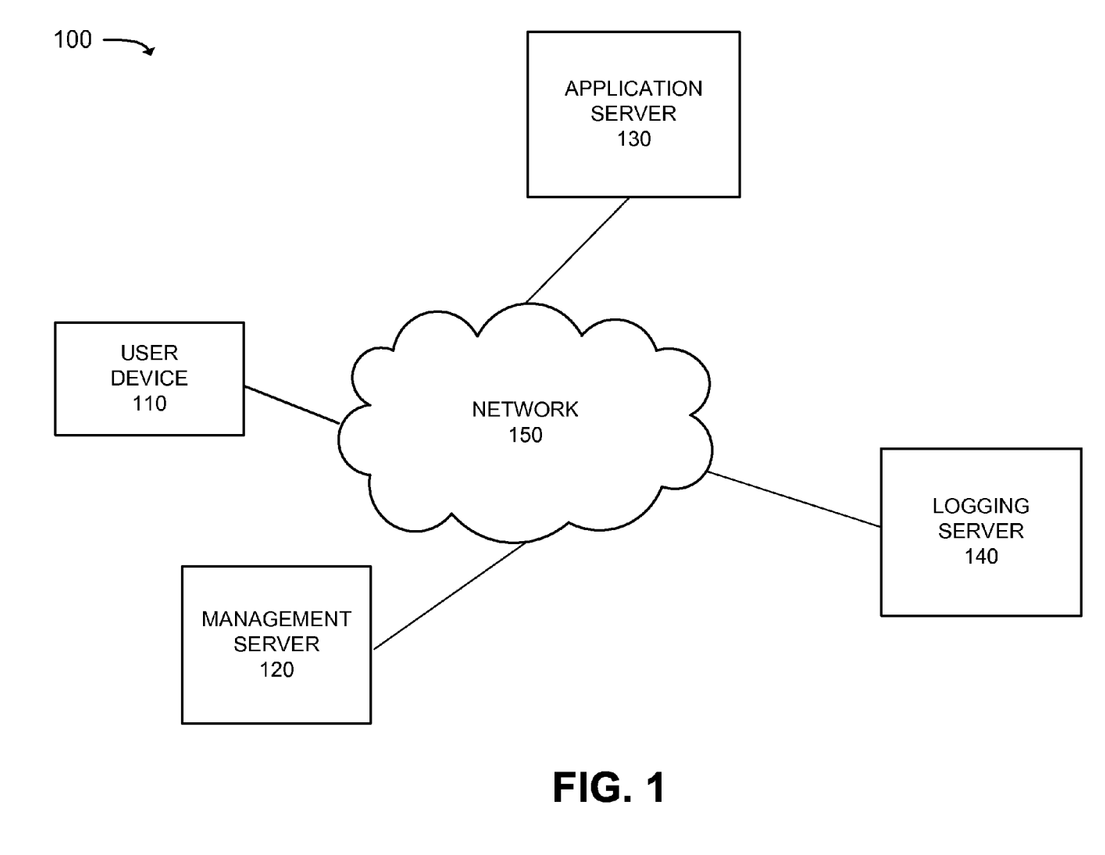
FIG. 1 is a diagram of an example environment in which systems and/or methods described herein may be implemented.

FIG. 1 is a diagram of an example environment 100 in which systems and/or methods described herein may be implemented. Environment 100 may include one or more of the following components: a user device 110, a management server 120, an application server 130, a logging server 140, and a network 150. In practice, environment 100 may include additional components, fewer components, different components, or differently arranged components than are shown in FIG. 1. In some implementations, one or more of the components of environment 100 may perform one or more functions described as being performed by another one or more of the components of environment 100.

Furthermore, two or more of the components, of FIG. 1, may be implemented within a single device, or a single component may be implemented as multiple, distributed devices. Also, components of environment 100 may interconnect via wired and/or wireless connections. In other words, any two components, of environment 100, may communicate via a wired connection, a wireless connection, or a combination of a wired connection and a wireless connection.

User device 110 may include any computation or communication device, such as a communication device that is capable of communicating with management server 120. In one implementation, user device 110 may take the form of any computer, including a web service terminal, a personal computer, a laptop, a handheld computer, a smart phone, a mobile telephone device, a personal digital assistant (PDA), a personal media player, etc., or any device capable of transmitting and/or receiving data.

User device 110 may enable a user to utilize a dashboard associated with management server 120. The user may include any person who is testing and/or monitoring applications being executed by application server 130. The dashboard may include an interface that allows the user to automatically test one or more applications, to access information about sessions associated with the one or more applications, and/or to monitor operations information associated with the performance of application server 130 and/or one or more other application servers, which execute sessions associated with the one or more applications. The dashboard may further allow the user to control how the testing and/or the monitoring are being performed.

Management server 120 may include any computation or communication device, such as a communication device that is capable of communicating with user device 110. Management server 120 may represent a single server device or a collection of multiple server devices and/or computer systems. As described further below in reference to FIG. 3, management server 120 may collect, manage, and provide information necessary to test applications executed by application server 130 and/or one or more other application servers and/or to monitor application servers 130 and/or the one or more other application servers. Management server 120 may receive instructions from user device 110. Management server 120 may provide information associated with the testing and the monitoring to user device 110 for user device 110 to display the information via a dashboard interface.

Application server 130 may represent a single server device or a collection of server devices and/or computer systems. Application server 130 may execute one or more particular applications (or one or more modules of a particular application) that are developed by an organization (e.g., a corporation). Application server 130 may receive a request to execute sessions of the application from user device 110 and/or one or more other user devices. Application server 130 may also transmit information associated with executing the sessions to logging server 140. Application server 130 may transmit operations information, associated with performance of hardware of application server 130, to management server 120.

Logging server 140 may represent a single server device or a collection of server devices and/or computer systems. Logging server 140 may receive information regarding different sessions from application server 130 and/or one or more other application servers. Logging server 140 may store logs, which include information about the sessions. Logging server 140 may transmit location information about the logs to management server 120. The location information may identify a session and specify a location in logging server 140 that stores a log associated with the session.

Network 150 may include a single network, multiple networks of a same type, or multiple networks of different types. For example, network 150 may include one or more of a direct connection between devices, a local area network (LAN), a wide area network (WAN) (e.g., the Internet), a metropolitan area network (MAN), a wireless network (e.g., a general packet radio service (GPRS) network), a telephone network (e.g., a Public Switched Telephone Network or a cellular network), a subset of the Internet, an ad hoc network, a fiber optic network (e.g., a fiber optic service (FiOS) network), or any combination of the aforementioned networks. Furthermore, any direct connection, shown in FIG. 1 between components of environment 100, may include/represent connections via network 150.

Figure 2:
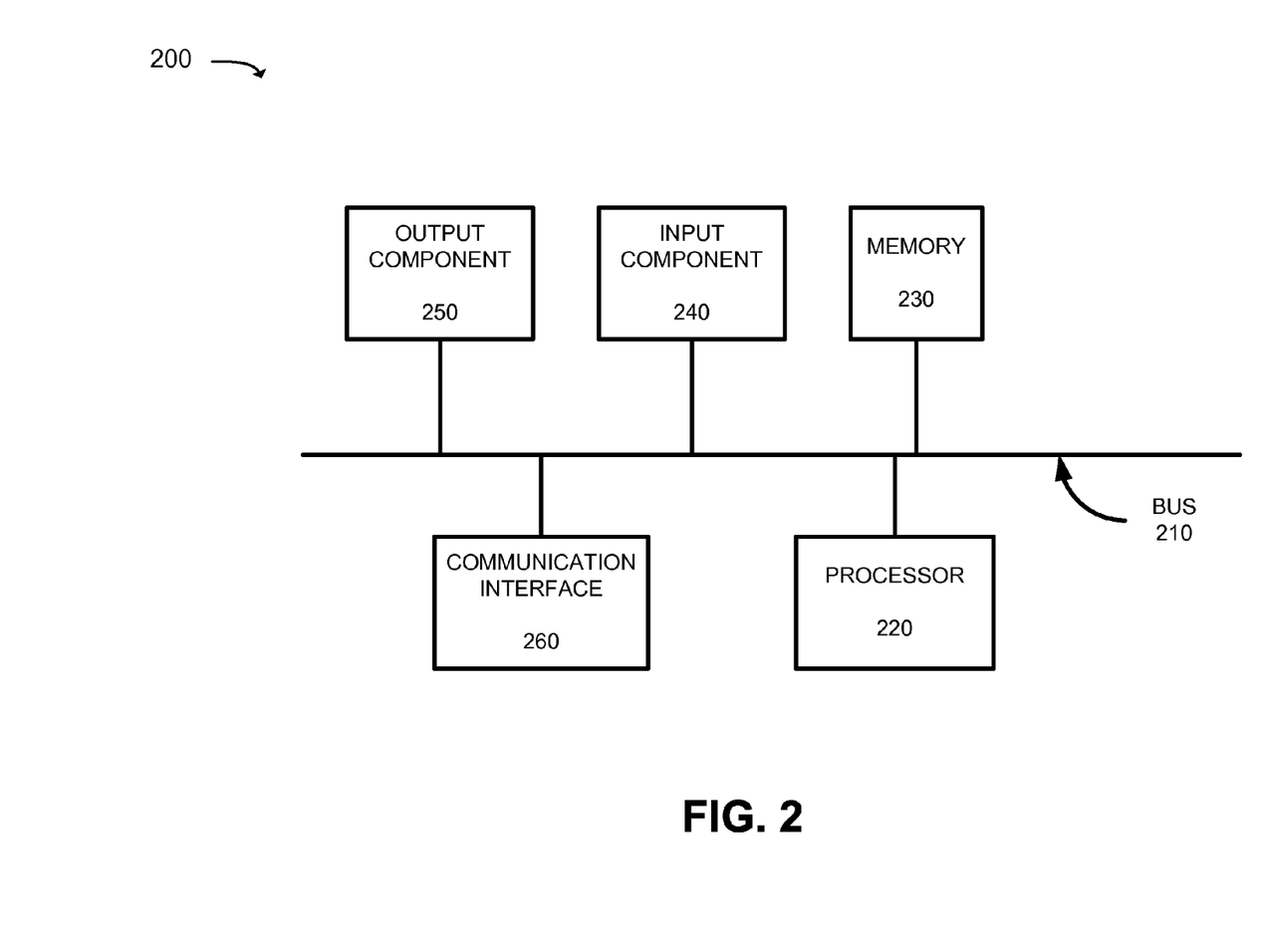
FIG. 2 is a diagram of example components of one or more devices of FIG. 1.

FIG. 2 is a diagram of example components of a device 200 that may be associated with user device 110, management server 120, application server 130, and/or logging server 140. Each one of user device 110, management server 120, application server 130, and/or logging server 140 may include one or more devices 200 and/or one or more of each one of the components of device 200.

As shown in FIG. 2, device 200 may include a bus 210, a processor 220, a memory 230, an input component 240, an output component 250, and a communication interface 260. In another implementation, device 200 may include additional components, fewer components, different components, and/or differently arranged components than are shown in FIG. 2. Additionally, or alternatively, one or more components of device 200 may perform one or more tasks described as being performed by one or more other components of device 200.

Bus 210 may include a path that permits communication among the components of device 200. Processor 220 may include a processor, microprocessor, or processing logic that may interpret and execute instructions. Memory 230 may include any type of dynamic storage device that may store information and instructions for execution by processor 220, and/or any type of non-volatile storage device that may store information for use by processor 220.

Input component 240 may include one or more input mechanisms that permit a user to input information to device 200. Output component 250 may include one or more output mechanisms that output information to the user. Examples of input and output mechanisms may include buttons; a touch screen interface to permit data and control commands to be input into user device 110; a speaker to receive electrical signals and output audio signals; a microphone to receive audio signals and output electrical signals; a display to output visual information (e.g., web pages, product information, etc.); etc.

Communication interface 260 may include any transceiver-like mechanism that enables device 200 to communicate with other devices and/or systems. For example, communication interface 260 may include an Ethernet interface, an optical interface, a coaxial interface, a wireless interface, or the like.

Device 200 may perform certain operations described herein. Device 200 may perform these operations in response to processor 220 executing software instructions (e.g., computer program(s)) contained in a computer-readable medium, such as memory 230, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
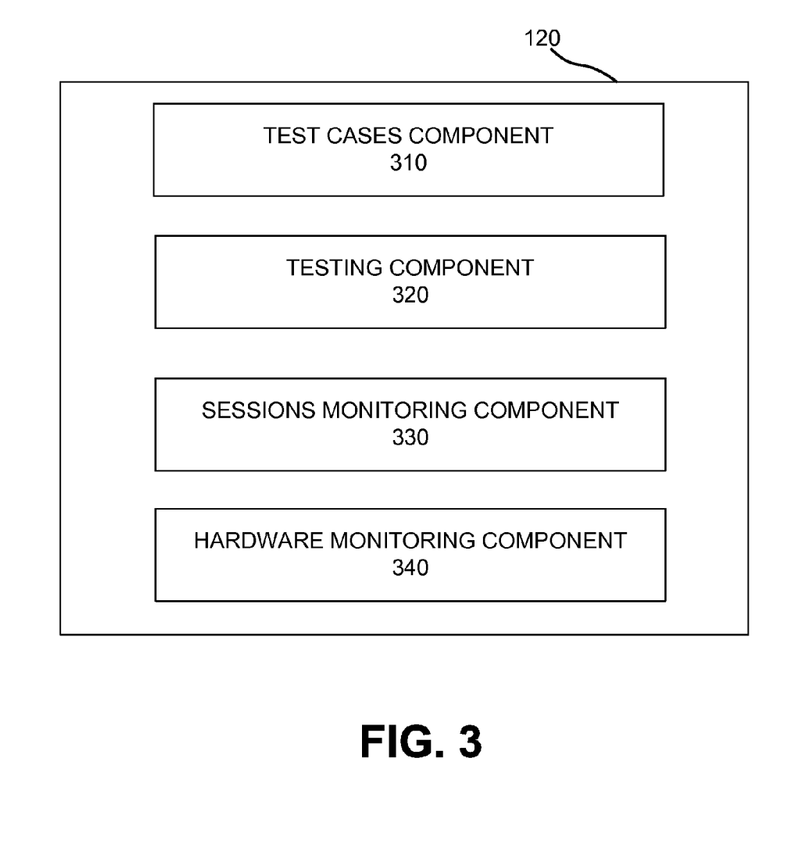
FIG. 3 is a diagram of example functional components of a management server.

FIG. 3 is a diagram of example functional components of management server 120. As shown in FIG. 3, management server 120 may include a test cases component 310, a testing component 320, a sessions monitoring component 330, and a hardware monitoring component 340.

Test cases component 310 may store information associated with different test cases that user device 110 may use to test applications executed by application server 130 and/or one or more other application servers. Each test case may correspond to a different test. Information associated with a test case may include an identifier of a server or a type of server for a test, a type of environment used for the test, instructions for executing the test, a request to use for the test, and/or an expected response in reply to the request. The type of environment may correspond to, for example a stage of development of the application (e.g., development, production, etc.). An expected response, of a test case, may be based on a response an application previously provided, in response to a particular request, before an update of the application. The test cases may allow a user to certify that the updated application continues to behave properly (i.e., as expected) even after the changes (e.g., addition/modification of one or more modules).

For example, a particular module of a particular application is expected to return a particular output (e.g., 10) when a particular input (e.g., 5+5) is passed to a function of the particular module. A test case for the particular module may include an identifier of the particular module, instructions to pass the particular input to the function as a request, and the particular output as an expected response. Information associated with a test case may also include categories associated with a test. Test cases component 310 may group the test case, based on the categories, with one or more other test cases into one or more groups.

Testing component 320 may provide information from test cases component 310 to user device 110. A user of user device 110 may use a dashboard to transmit a request to test a particular application. Testing component 320 may receive the request and determine whether the user may use user device 110 to test the particular application based on authentication information associated with the user (e.g., name and password) and/or information associated with user device 110 (e.g., hardware information of user device 110, networks associated with user device 110, etc.). Testing component 320 may retrieve test cases, from test cases component 310, that are used to test the particular application. Testing component 320 may transmit the test cases to user device 110 when the user is authorized to utilize user device 110 to test the particular application. User device 110 may use one or more of the test cases to perform one or more tests associated with the test cases. The user may also transmit instructions to testing component 320 to modify one or more test cases stored by test cases component 310. For example, the user may transmit instructions to modify an expected response of a test case. Testing component 320 may modify a test case based on the instructions from the user when the user is authorized to modify the test case.

Sessions monitoring component 330 may store and provide information associated with sessions executed by application server 130 and/or one or more other application servers. When application server 130 executes a session, application server 130 may transmit information associated with the session to logging server 140. Logging server 140 may store the information associated with the session as a log. Logging server 140 (or application server 130) may transmit information indicating that logging server 140 stores the log associated with the session. A user of user device 110 may use a dashboard to request information associated with sessions executed by application server 130. Session monitoring component 330 may provide a list of sessions, executed by application server 130, to user device 110. The user of user device 110 may use the dashboard to select one of the sessions. Session monitoring component 330 may provide location information associated with the selected session. The location information may specify a location in logging server 140 that stores the log associated with the selected session.

Hardware monitoring component 340 may store and provide information associated with hardware operations of application server 130 and/or one or more other application servers. Hardware monitoring component 340 may receive instructions to monitor application server 130. In response, hardware monitoring component 340 may retrieve operations information from application server 130. The operations information may include CPU usage of application server 130; memory usage of application server 130; a number of requests received by application server 130; an average amount of time, spent by application server 130, to process one of the requests; and/or any other information associated with executing sessions of application server 130 in order to process the requests. In another implementation, hardware monitoring component 340 may also retrieve operations information from any other devices (e.g., logging server 140) associated with application server 130.

Hardware monitoring component 340 may also continuously analyze the operations information to determine significant changes in the operations information. Hardware monitoring component 340 may transmit the operations information and/or the analysis to user device 110 after a user of user device 110 accesses a dashboard associated with management server 130 and/or after the user requests the operations information and/or the analysis. User device 110 may display the operations information, the analysis, and/or representation(s) based on the operations information and/or the analysis in a user interface of the dashboard.

Figure 4:
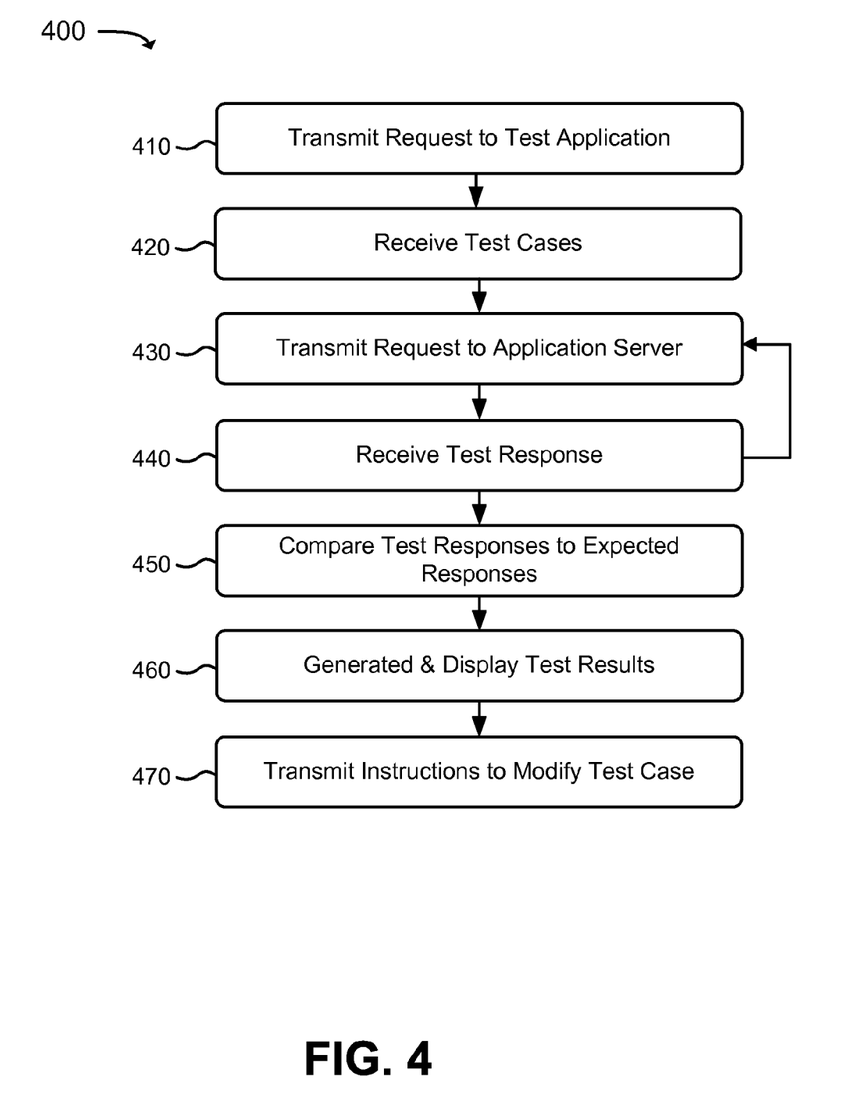
FIG. 4 is a flowchart of an example process for testing an application.

FIG. 4 is a flowchart of an example process 400 for testing an application. In one implementation, user device 110 may perform process 400. In another implementation, a device or collection of devices separate from, or in combination with, user device 110 may perform some or all of process 400.

As show in FIG. 4, process 400 may include transmitting a request to test an application (block 410). For example, a new module may be added to an application executed by application server 130. A user may test the application with the new module before certifying that the application may be used/released with the new module. To do so, a user of user device 110 may open a dashboard used for testing and monitoring applications. The dashboard may include an interface of a client that interacts with management server 120. The user may elect to test the application and specify, via the interface, an identifier associated with the application. User device 110 may generate a request to test the application. The request to test the application may include the identifier associated with the application, authentication information associated with the user, and/or device information associated with user device 110. The authentication information may include a unique identifier associated with the user, a username, and/or a password. The device information may include a unique identifier associated with user device 110, information regarding hardware of user device 110, a location of user device 110, security settings of user device 110, and/or information regarding networks connected to user device 110. User device 110 may transmit the request to test the application to management server 120.

Test cases may be received (block 420). For example, management server 120 may receive the request to test the application. Management server 120 may, first, determine whether the user is authorized to test the application. For example, management server 120 may store or have access to a list of users who are authorized to receive information from management server 120. Management server 120 may determine that the user is authorized to test the application when the user is included in the list of users (e.g., the unique identifier associated with the user is included in the list of users and/or a username/password provided for the user are correct). Management server 120 may further determine whether the user is allowed to utilize user device 110 to test the application. For example, management server 120 may store criteria that must be met by user device 110 before the user is allowed to use user device 110 to test the application. Management server 120 may determine whether the criteria are met based on the device information included in the request to test the application.

When management server 120 determines that the user is allowed to utilize user device 110 to test the application, management server 120 may retrieve, based on the identifier of the application, test cases used to test the application. Each one of the test cases may correspond to a test. A test case may include a request used for the test; an identifier associated with application server 130, which is used to execute a session of the application for the test; instructions for transmitting the request to application server 130; a type of environment of application server 130 used for the test; an expected response in reply to the request; and/or categories associated with the request. Management server 120 may transmit the test cases to user device 110. User device 110 may display the test cases.

A test request may be transmitted to an application server 130 (block 430). For example, user device 110 may group test cases into one or more groups based on categories associated with the test cases. For example, user device 110 may group one or more of the test cases, which are all associated with a particular category, a particular server, and/or a particular environment, into a single group. User device 110 may group one or more of the test cases into multiple groups. User device 110 may display information about the multiple groups. The user of user device 110 may select a group of test cases. User device 110 may connect to application server 130. User device 110 may transmit a request of a test case in the group, based on information included in the test case, to application server 130.

A test response may be received (block 440). For example, application server 130 may receive the request from user device 110. Application server 130 may execute a session of the application in order to fulfill the request. Application server 130 may transmit information about the session to logging server 140. Application server 130 may determine/generate an output of the session in response to the request. Application server 130 may transmit the output, as a test response, to user device 110. User device 110 may receive the test response. User device 110 may continuously and/or simultaneously transmit requests, corresponding to all of the test cases in the group, to application server 130 (block 430) and receive test responses in reply to the requests (block 440).

Test responses may be compared to expected responses (block 450). For example, after user device 110 receives the test responses in reply to the requests of the test cases associated with the selected group, user device 110 may compare the test responses to the expected responses of the test cases. Accordingly, for each one of the test cases used to test the application, user device 110 may determine whether a received test response matches a corresponding expected response. For example, user device 110 may determine that the test response matches the expected response when contents of an Extensible Markup Language (XML) of the test result are equivalent to contents of an XML of the expected result. In another implementation, device 110 may determine that the test response matches the expected response when a value of the test response (e.g., 10) is equal to a value the expected response (e.g., 10).

Test results may be generated and displayed (block 460). For example, user device 110 may generate the test results based on the comparisons of the test responses to the expected responses. User device 110 may determine that the application passed a test of a test case when a test response, received in reply to a request of the test case, matches an expected response of the test case. User device 110 may determine that the application failed a test of a test case when a test response, received in reply to a request of the test case, does not match an expected test response of the test case. In another implementation, user device 110 may determine that the application failed a test of a test case when user device 110 does not receive any response associated with a test case (e.g., after a particular period of time) and/or does not receive a proper response. For example, user device 110 may not receive a proper response when user device receives a message from application server 130 that application server 130 may not provide a test response in reply to the request.

User device 110 may generate a test result for each test case used to test the application. Each test result may include an identifier associated with the test case; information regarding a test of a test case, a request used for the test, and/or the test case; one or more categories associated with the test case; information regarding an environment used to execute a session for the request; information regarding a server (e.g., application server 130) used to execute the session; an identifier associated with the session; a status associated with the test (e.g., whether the application passed the test or failed the test); and/or details about the status. The details about the status may include, for example, messages that provide information about why the application failed the test. User device may display the test results in the dashboard.

Instructions to modify the test case may be transmitted (block 470). For example, a user may use the dashboard to select one of the test results. In response, user device 110 may display an analysis interface for the selected test result. The analysis interface may include a request associated with the test result, a test response associated with the test result, and an expected response, of a test case, associated with the test result. The user may utilize the analysis interface to determine whether, for example, the test response indicates that the application should have passed the test of the test case. The user may use the dashboard to indicate (e.g., user device 110 may receive, from the user, an indication) that the test response should be used as an expected response for the test. User device 110 may transmit instructions, based on the indication, to modify the test case to management server 120. The instructions may direct management server 120 to modify the test case by using the test response as an expected response of the test case (e.g., by replacing the existing/current expected response of the test case with the test response). The instructions may include an identifier of the test case and the test response.

Figure 5:
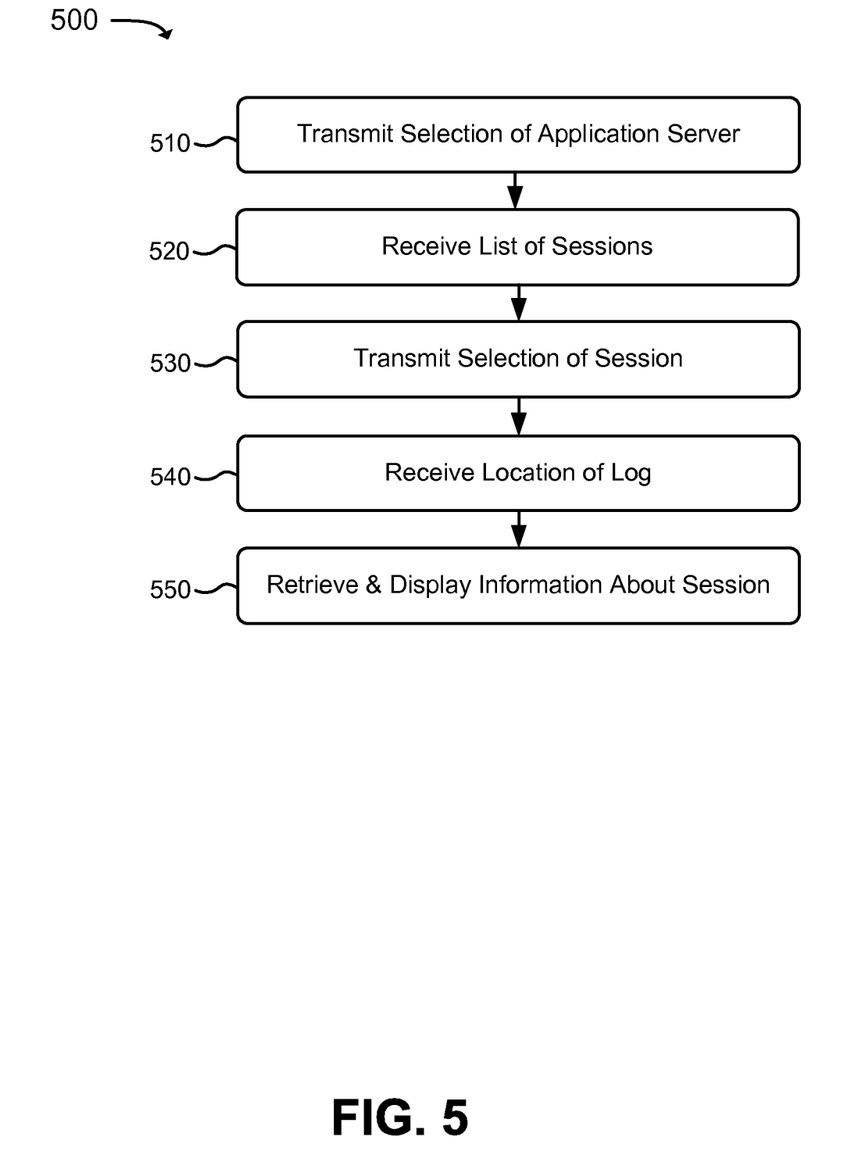
FIG. 5 is a flowchart of an example process for retrieving information about a session of the application.

FIG. 5 is a flowchart of an example process 500 for retrieving information about a session. In one implementation, user device 110 may perform process 500. In another implementation, a device or collection of devices separate from, or in combination with, user device 110 may perform some or all of process 500.

As show in FIG. 5, process 500 may include transmitting a selection of an application server (block 510). For example, user device 110 may display a dashboard used for testing and monitoring applications. A user of user device 110 may use the dashboard to select an option to retrieve information about a session. User device 110 may display a list of identifiers corresponding to application servers, including, for example, application server 130. The user may utilize the dashboard to only access information about sessions executed by the applications servers identified on the list. The user may select one of the application servers (e.g., application server 130) from the list. User device 110 may transmit the selection of, for example, application server 130 to management server 120. Transmitting the selection of application server 130 may include, for example, transmitting an identifier associated with application server 130.

A list of sessions may be received (block 520). For example, management server 120 may receive the selection of application server 130. Management server 120 may retrieve identifiers of sessions which were executed by application server 130 based on, for example, the identifier associated with application server 130. The sessions may only include sessions which were executed within a particular period of time. Management server 120 may generate a list of sessions that includes the identifiers of the sessions. Management server 120 may transmit the list of sessions to user device 110. User device 110 may receive the list of sessions.

A selection of a session may be transmitted (block 530). For example, user device 110 may display, in a user interface of the dashboard, the identifiers included in the list of sessions. In another implementation, user device 110 may display the identifiers of sessions as part of test results, as described above, for example, with reference to block 460 of FIG. 4. The user may use the dashboard to select one of the sessions by, for example, selecting an identifier or a test result associated with the one of the sessions. In response, user device 110 may transmit the selection of the session to management server 120. Transmitting the selection of the session may include, for example, transmitting the identifier of the session.

A location of a log may be received (block 540). For example, when application server 130 executes a session, application server 130 may transmit information about the session to logging server 140. Logging server 140 may store the information about the session as/in a log. Logging server 140 and/or application server 130 may notify management server 120 that logging server 140 stores the log for the session. Accordingly, management server 120 may store locations of different logs corresponding to different sessions. Each one of the locations may identify a particular logging server (e.g., logging server 140). Management server 120 may identify a location of a log associated with the identifier of the session. The location, for example, may specify that logging server 140 stores the log associated with the session. The location may include, for example, an identifier associated with logging server 140. Management server 120 may transmit the location of the log to user device 110. User device 110 may receive the location of the log.

Information about the session may be retrieved and displayed (block 550). For example, user device 110 may retrieve information about the session from a log stored by logging server 140. User device 110 may transmit a request, for information about the session, to logging server 140. Logging server 140 may receive the request. The request may include the identifier associated with the session. Logging server 140 may retrieve, based on the identifier associated with the session, the information about the session from the log associated with the session. Logging server 140 may transmit the information about the session to user device 110. User device 110 may display the information about the session in an interface of the dashboard. The information about the session may include, for example, a response time associated with the session; one or more errors associated with the session; an identifier of the server (e.g., application server 130) that executed the session; information about a request that prompted the session; a response, to the request, generated by the session; and/or any other information associated with the execution of the session (e.g., information (e.g., operations information) associated with performance of application server 130 during the execution session).

Figure 6A:
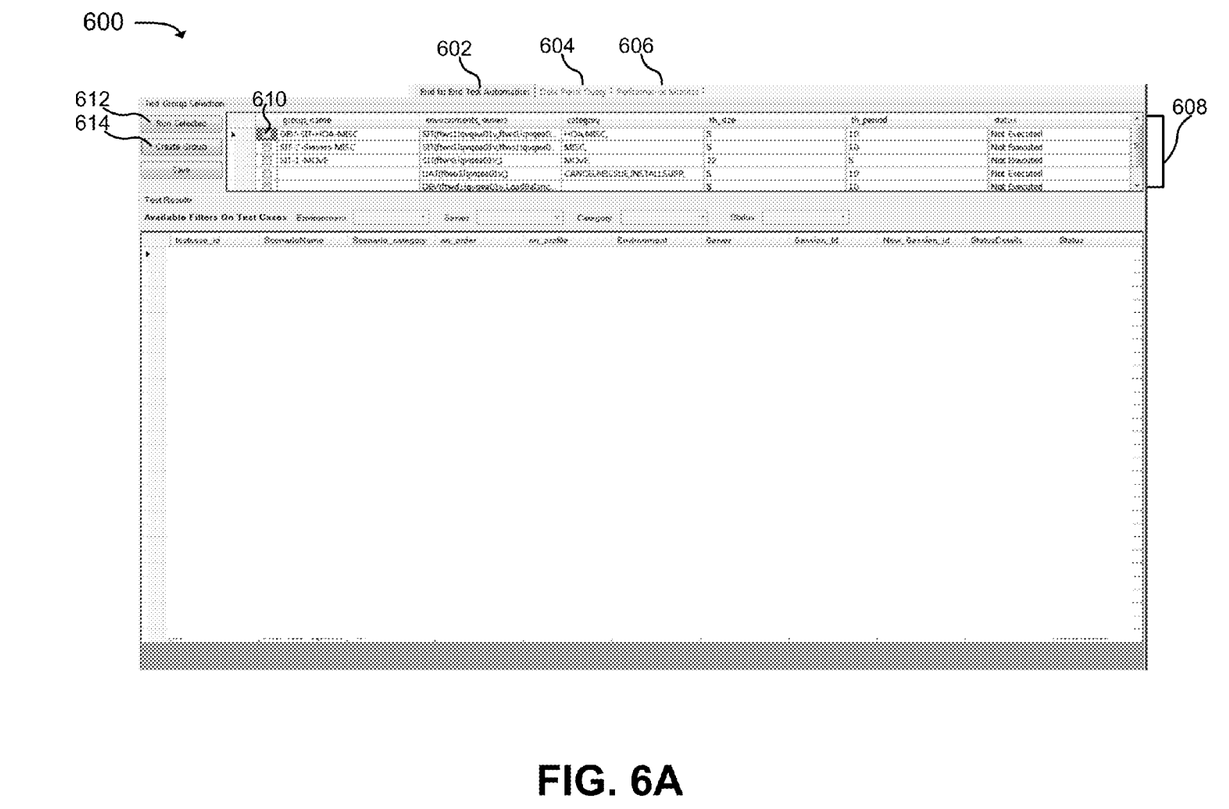
FIGS. 6A-6D illustrate example user interfaces of a dashboard used to test applications and monitor sessions.
Figure 6B:
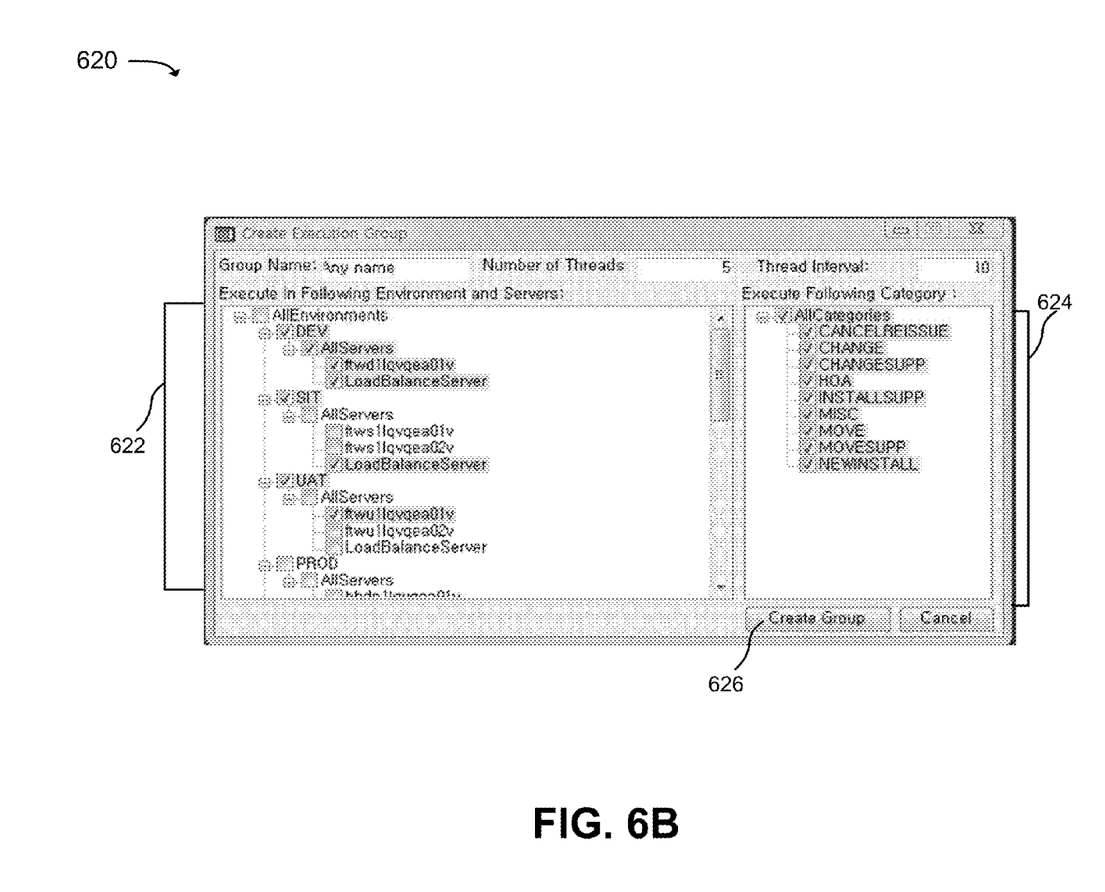

FIGS. 6A-6D illustrate example user interfaces of a dashboard used to test applications, to retrieve information about sessions of applications, and/or to monitor operations of application servers that execute applications. For example, application server 130 may execute a session of an application. Assume that a module of the application is modified, and that a user is tasked with testing that the application works properly with the modified module. The user of user device 110 may open a dashboard, which may be a client of user device 110 that interacts with management server 120. The dashboard may include a user interface 600 (FIG. 6A). The dashboard may open user interface 600 when the user specifies/identifies/selects the application and selects a tab 602 to prompt a process for automatic testing. User interface 600 may include a tab 604 and a tab 606. The user may select tab 604 in order to retrieve information about a particular session. The user may select tab 606 in order to retrieve operations information of application server 130 and/or one or more other application servers.

User device 110 may retrieve, from management server 120 and after the user selects tab 602, test cases associated with the application. User interface 600 may include a listing of groups 608. Each one of the groups, in listing of groups 608, may correspond to one or more of the test cases associated with the application. The user may select a checkbox 610, corresponding to a first group the groups, and select a button 612 in order to run tests associated with test cases in the first group.

User interface 600 may also include a button 614 to start a process for creating a new group. When the user selects button 614, user device 110 may open a user interface 620 (FIG. 6B) of the dashboard. User interface 620 may include an area 622 and an area 624. The user may use area 622 to select one or more types of environments and/or one or more servers. The user may use area 624 to select one or more categories. When the user selects a button 626, of user interface 620, user device 110 may create a new group based on the selected environments, the selected servers, and/or the selected categories. The new group may include only test cases associated with the selected environments, the selected servers, and/or the selected categories. User device 110 may add an entry for the new group to listing of groups 608 of user interface 600 (FIG. 6A).

After the user selects button 612 (FIG. 6A), user device 110 may open a user interface 630 (FIG. 6C) of the dashboard. User interface 630 may include test results 632. Each one of test results 632 may correspond to one of the test cases of the first group. Each listing of test results 632 may include an identifier of a test case (e.g., 1), instructions that specify when a test of the test case is performed (e.g., "When valid request" (e.g., a request may be valid when the request meets particular criteria)), an environment (e.g., a development environment (e.g., "DEV")) in which a session of the application is executed in response to the request, an identifier (e.g., "fwlqdevrere") of a server (e.g., application server 130) that executes the session, an identifier (e.g., 9999) associated with the session, a status (e.g., Passed, Failed, Interrupted, In Progress . . . , etc.) that indicates whether the application passed the test, and/or other information associated with performance of the test.

Figure 6C:
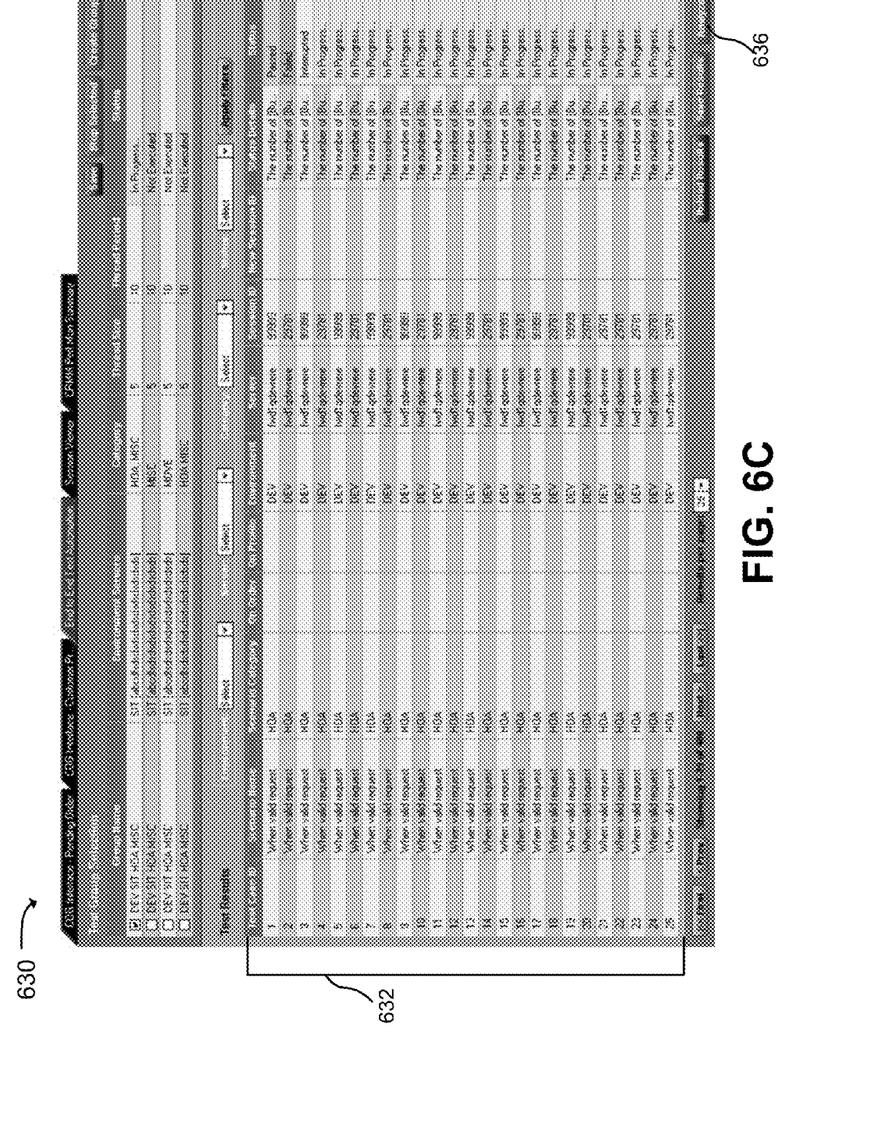

When the user selects one of the test results, from test results 632, and selects a button 636, user device 110 may open a user interface 640 (FIG. 6D) of the dashboard. User interface 640 may include an analysis interface 642, a test cases listing 646, and a status details area 648. Analysis interface 642 may include an area to display a request (e.g., "RequestXML") associated with the selected test result; an area to display a test response (e.g., "ManualResponseXML") received, from application server 130, in reply to the request; and an area to display an expected response (e.g., "TargetResponseXML") that is specified in a test case associated with the selected test result. The user may utilize analysis interface 642 to analyze, for example, why the application did not pass a test of the test case. When the user selects a button 644, of user interface 640, user device 110 may highlight, in analysis interface 642, one or more portions of the test response and the expected response that differ from one another.

Figure 6D:
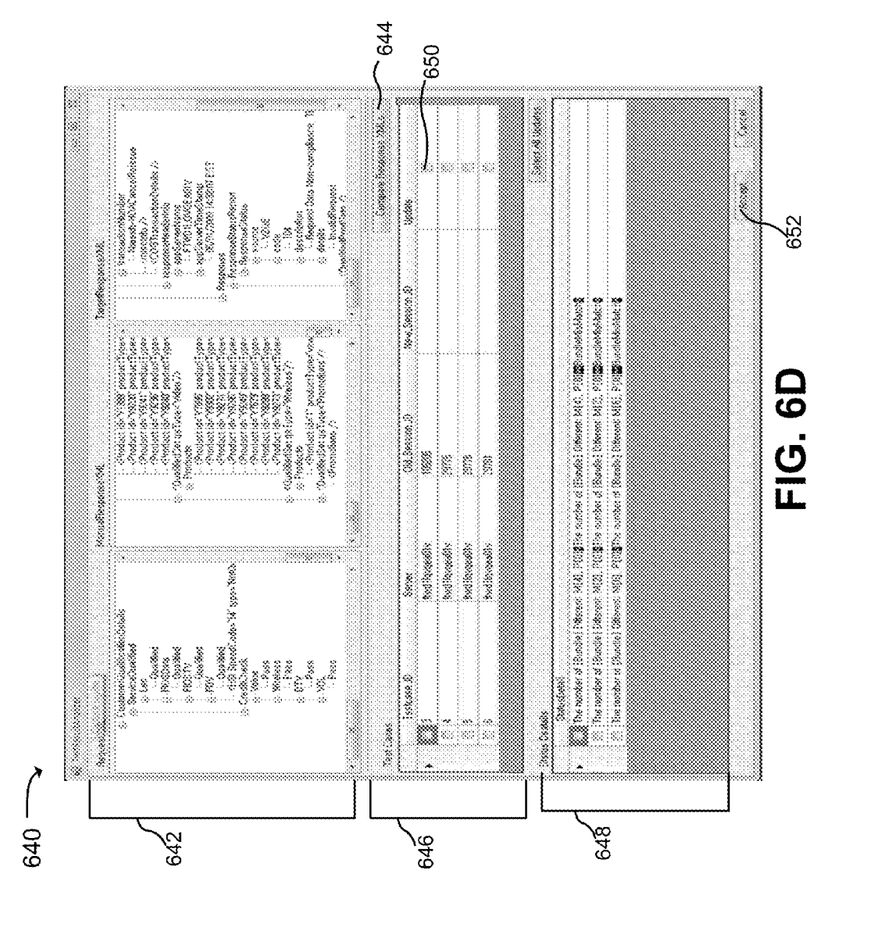

Test cases listing 646 may include a listing of test cases corresponding with test results 632 (FIG. 6C). Status detail area 648 may include messages that provide information about why the application failed the test. For example, the messages may include information about which portions of the test response differ from which (corresponding) portions of the expected response.

Assume that the user determines that the test response is the correct output in response to the request. The user may select a checkbox 650 and a button 652. In response, user device 110 may transmit instructions to modify a test case, for example, associated with identifier "3." Management server 120 may receive the instructions and replace contents of the expected response of the test case with the test response displayed in analysis interface 642.

Although FIGS. 6A-6D depict example information that may be provided in user interfaces displayed by user device 110, in other implementations, the user interfaces may include less information, different information, or additional information than depicted in FIGS. 6A-6D.

The foregoing description provides illustration and description, but is not intended to be exhaustive or to limit the embodiments to the precise form disclosed. Modifications and variations are possible in light of the above teachings or may be acquired from practice of the embodiments.

While series of blocks have been described with regard to FIGS. 4 and 5, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the invention. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a computer device, a test case from a management server, wherein the test case comprises:
      a request used for a test of an application,
      one or more categories of types of tests associated with the test case,
      an expected response to the request, and
      an identifier of an application server that executes the application;
   grouping, by the computer device and based on the one or more categories, the test case with other test cases into multiple groups of test cases;
   presenting, by the computer device, information related to the multiple groups of test cases;
   receiving, from a user of the computer device, selection of one or more of the multiple groups of test cases to which the test case belongs;
   transmitting, by the computer device and based on the identifier, the request to the application server responsive to the received selection;
   receiving, by the computer device, a test response in reply to the request;
   generating, by the computer device and for the test, a test result based on the expected response and the test response; and
   providing for display, by the computer device, the test result.

2. The method of claim 1, further comprising:
   receiving a selection to test the application;
   generating a request to test the application based on the selection, where the request to test the application comprises an identifier associated with the application; and
   transmitting, to the management server, the request to test the application,
      where the test case is associated with the application, and
      where the computer device receives the test case in response to the request to test the application.

3. The method of claim 1,
   where generating the test result comprises:
      determining whether the test response matches the expected response,
   where the test result indicates that the application passed the test when test response matches the expected response, and
   where the test result indicates that the application failed the test when test response fails to match the expected response.

4. The method of claim 1, further comprising:
   receiving a selection of the test result; and
   providing for display, in response to the selection of the test result, in an interface:
      the request,
      the test response, and
      the expected response.

5. The method of claim 4, further comprising:
highlighting, when the test result indicates that the application failed the test, a portion of the test response that is different from a portion of the expected response.

6. The method of claim 1, further comprising:
receiving an indication, from a user of the computer device, to modify the test case based on the test response; and
transmitting instructions, based on the indication, to the management server, where the instructions comprise an identifier of the test case and the test response.

7. The method of claim 1, where the test result comprises an identifier of a session of the application, executed by the application server, for the request.

8. The method of claim 7, further comprising:
receiving a selection of the identifier of the session;
transmitting, based on the selection, the identifier of the session to the management server; and
receiving, from the management server, a location of a log associated with the session, where the log comprises information about the session.

9. The method of claim 7, further comprising:
transmitting, to a logging server identified by the location, a request for the information about the session; and
receiving, from the logging server, the information about the session, where the information about the session comprises at least one of:
a time associated with the session, or
one or more errors that occurred during the session.

10. The method of claim 1,
wherein the computer device receives one or more other test responses, corresponding to the test results, from the application server.

11. A server device comprising:
a storage device to store test cases used to test an application; and
a processor to:
receive, from a device, a request to test the application, wherein the request to test the application comprises an identifier of the application,
retrieve, based on the identifier of the application, the test cases from the storage device,
transmit the test cases to the device,
receive a location of a log associated with a session that is executed in response to a request associated with one of the test cases, wherein the log includes session information comprising:
a response time associated with the session,
one or more errors associated with the session,
information about a request that prompted the session, and
a response, to the request, generated by the session, and
store, in the storage device, the location in association with an identifier of the session.

12. The server device of claim 11,
wherein the location comprises an identifier of a logging server, and
where the processor is further to:
receive, from the device, a request for the session information, wherein the request for the session information further comprises the identifier of the session,
retrieve, based on the identifier of the session, the location of the log, and
transmit, to the device, the location of the log.

13. The server device of claim 11, wherein the processor is further to:
receive, from an application server, information about operations of the application server that executes the session, and
transmit, to the device, the information about the operations.

14. The server device of claim 13, wherein the information about the operations comprises information about one or more of:
central processing unit (CPU) usage of the application server,
memory usage of the application server, or
a number of requests received by the application server.

15. One or more non-transitory computer-readable media storing instructions executable by one or more processors of a computing device, the media storing one or more instructions for:
transmitting, to a first server, a request to test an application, wherein the request is associated with one or more categories of types of tests;
receiving, from the first server, test cases used to test the application;
grouping, based on the one or more categories, a first one of the test cases with other ones of the test cases into multiple groups of test cases;
providing, for display, a listing of the multiple groups, wherein each one of the multiple groups corresponds to one or more of the test cases;
receiving a selection of at least one of the multiple groups;
transmitting, to a second server, requests of the test cases corresponding to the selected at least one of the multiple groups;
receiving, from the second server, test responses in reply to the requests; and
providing for display one or more test results based on the test responses.

16. The media of claim 15,
where a particular test result of the one or more test results corresponds to one of the test cases, and
where the particular test result indicates whether the application passed or failed a particular test associated with the one of the test cases.

17. The media of claim 15, where the media further stores instructions for:
receiving a selection of a particular test result of the one or more test results, where the particular test result comprises an identifier of a session of the application, executed by the second server, for one of the requests;
transmitting, based on the selection, the identifier of the session to the first server, and
receiving, from the first server, a location of information about the session.

18. The media of claim 17, where the media further stores instructions for:
transmitting a request for the information about the session to a third server identified by the location;
receiving, from the third server, the information about the session; and
providing for display the information about the session in an interface of a dashboard used to communicate with the first server.

19. The media of claim 15, wherein the media further stores instructions for:
- receiving a request to create a new group,
- providing, for display, an interface for selecting one or more of:
  - one or more environments used to test the applications, and
  - the one or more categories of types of tests associated with the test cases, and creating the new group based on the selected environments and the selected categories,
- wherein the new group comprises one or more of the test cases that are associated with the selected environments and the selected categories, and
- wherein the listing of the multiple groups comprises an entry corresponding to the new group.

\* \* \* \* \*